Sept. 18, 1951     A. E. SPINASSE ET AL     2,567,976
INDUCTION MOTOR AND METHOD OF OPERATION
Filed Aug. 27, 1945

INVENTORS
Arthur E. Spinasse
William W. Pumphrey Sr.

Patented Sept. 18, 1951

2,567,976

UNITED STATES PATENT OFFICE 2,567,976

INDUCTION MOTOR AND METHOD OF OPERATION

Arthur E. Spinasse and William H. Pumphrey, Sr., Mount Vernon, Ohio; Herman Cornell administrator of said Arthur E. Spinasse, deceased Application August 27, 1945, Serial No. 612,804

9 Claims. (Cl. 172—278)

1

This invention relates to an induction motor of a new and improved design, and efficiency and to a novel method of construction wherein a rotary magnetic field is produced in the stator by the splitting of a single phase alternating current. The current is such as to initiate and maintain rotation of the armature or rotor in one direction when said motor is energized by suitable alternating current and to be free from the influence of any short circuited conventional shading means or any opposing shading means. It includes means and a method of operation such that the rotary magnetic field threading the rotor and hence the direction of rotation of said armature or rotor may be automatically reversed and maintained by use of short circuited wound reverse phase splitting reversing coil means.

The object of the invention also includes the provision of novel means and an improved method of obtaining a rotary magnetic field in a split phase electric motor having only two field poles.

Another object of the invention is to provide a novel motor of the above character which develops a substantial amount of torque and in which the reversal of the direction of rotation of the rotor can be controlled from a very low voltage obtained directly from a wound coil circuit preferably by a simple single switch or other type of switch known in the art.

Another object of the present invention is to include the reversing coils in a common circuit having a two point contact switch of any suitable form or type adapted to open and close in response to a change in temperature so that when the switch is closed and the reversing coils are short circuited the motor being also energized will at once automatically initiate and maintain rotation in one direction, and when the switch opens the motor will at once automatically initiate and maintain rotation in the opposite direction free from the influence of any short circuited shading coils.

Another object of the present invention is to provide new and useful improved means for interrupting the rotation of the motor, after predetermined rotation of the motor in either direction, and when desired to restore the continuity of rotation.

Further objects of this invention will be apparent from the following specification taken in connection with the drawings wherein like symbols refer to like or corresponding parts throughout the several views in which:

Figure 1 is an elevational view of a two pole

2 electric motor embodying the features of the present invention. Means other than shading means including a magnetic shunt member are shown to initiate and maintain rotation of the motor in one direction when the motor is energized.

Figs. 2 and 3 are also elevational views showing modified forms of the same invention including shunt members adapted to automatically initiate and maintain rotation of the motor in one direction when energized and free from the influence of short circuited shading means and including wound reverse phase splitting coils for reversing the direction of rotation of the motor when said coils are short circuited.

Fig. 4 of the drawings is a fractional perspective view showing a form and location of the shunt member as utilized in the present invention for producing a rotary magnetic field.

Figure 1:
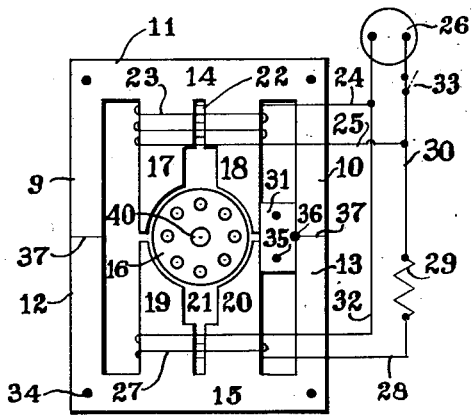
Figure 4:
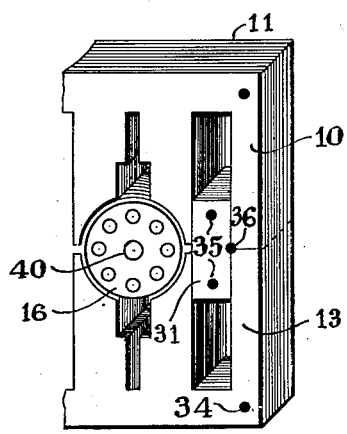

Referring more in detail to the drawings and to the method of operation, Figure 1 illustrates a two pole split phase self starting alternating current induction motor adapted when energized to initiate and maintain rotation in the desired direction without the use of conventional shading coils. Said motor comprises a stator 11 made up of suitable packed laminations, consisting of sections suitably joined together preferably at junction 37—37 as shown. The motor may be circular or in any desired form in this case rectangular in contour with opposite legs or branches 12 and 13 and opposite portions 9 and 10, including inwardly projecting main pole members 14 and 15 disposed on said portions between which rotor or armature 16 is adapted to rotate. The rotor 16, which may be of the squirrel cage type or other suitable form is mounted on shaft 40 supported on bearing 38 suitably seated in frame or housing 39 and 59. The other end of the shaft (not shown) is mounted on a suitable bearing in the opposite wall of said housing, Fig. 5. Said pole member 14 is divided into two main field pole piece sections 17 and 18 and pole member 15 is also divided into two auxiliary field pole piece sections 19 and 20. Relatively large spaces 21 and narrow spaces 22 extending to portions 9 and 10 are preferably provided between said pole piece sections 17 and 18 and also between the pole sections 19 and 20. A main field coil winding 23 is disposed to embrace said pole sections 17 and 18, the same having conductors 24 and 25 leading to a source of suitable power 26. An auxiliary field coil winding 27 embracing the pole piece sections 19 and 20 is also provided as shown, the same having conductor 32 leading directly to the source of power 26 and a conductor 28 connected to a suitable resistor 29, said resistor being connected in series in the circuit of conductors 28 and 30 and also to the source of power 26 for the purpose of producing a phase difference between the currents existing in the auxiliary field coil winding 27 and the currents in the main field coil 23. The preferred winding ratio is approximately 1.3 turns in the main field winding 23 to 1 turn in the auxiliary field winding 27. A magnetic motor starting shunt link member 31 is also provided and positioned in close spaced relation to different predetermined portions of said poles and stator, however, the said magnetic shunt link member is preferably positioned in contact with the leg member 13 and extends in close contact with or integrally connected with the pole piece sections 18 and 20 on the same side of the stator as shown. For clarity, Fig. 4 shows the shunt member 31 in perspective illustrating its form, position and location with respect to the other portions of the poles and stator. Said magnetic shunt member 31 may be made solid but preferably it is made up of a suitable number of laminations of silicon-steel or other suitable magnetic materials compactly held together by rivets 35—35 and held in the desired predetermined contacting position with the leg members 10 and 13 and pole piece sections 18 and 20 of the core member 11 by suitable means such as rivet 36. When the motor and magnetic shunt members are energized by closing switch 33 a rotary magnetic field is produced in the motor and the motor will at once initiate and maintain rotation with full torque in the desired direction and at the desired speed of rotation, synchronous or otherwise. It will be clear that the sections forming the stator 11 are held in the desired assembled position by means of rivet 34 or by any other means known in the art.

Figure 2:
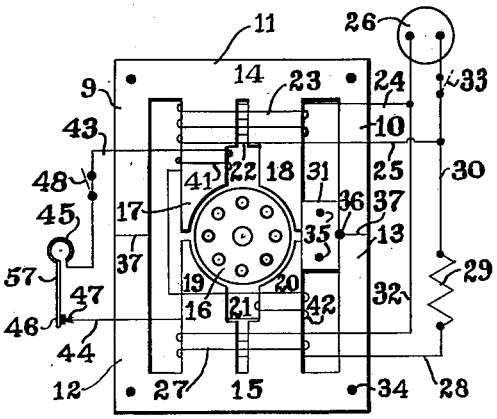

As previously pointed out the pole piece members are each divided into two sections or branches respectively. An additional magnetic circuit is provided in the motor in the form of a magnetic shunt member 31 linking two of the divided pole piece sections 18 and 20 to the stator legs 13 and 14, said magnetic circuit being arranged to cause a magnetic flux flow through a portion of the leg 13, pole section 20 and shunt member 52 thus encircling field coil member 59 as is apparent in Fig. 3. In the case of Fig. 2, the magnetic circuits are arranged to cause a magnetic flux flow through portions of leg members 10 and 13, pole piece section members 18 and 20 respectively and shunt member 31 and thus encircling field coil members 23 and 27 respectively the purpose of which is to obtain flux shifting coaction between the magnetic flux produced by the main field pole and the auxiliary field pole members to produce a rotary magnetic field threading the rotor 16. By decreasing the magnetic impedance or reluctance of the pole piece sections so linked a phase difference is obtained between the pole piece sections so linked to the stator and the pole piece sections not so linked to the stator by the magnetic shunt link member 31 and in combination with the phase difference in the currents already existing between the main field member and the auxiliary field member obtained by the splitting of the single phase alternating current energizing the motor, a rotary magnetic field comparable to that which is produced by the conventional four pole split phase motor is obtained. However, in this motor due to the design herein described the direction of rotation of the rotary magnetic field thus produced may be reversed under the influence of energized short circuited reverse phase splitting coils suitably disposed on the pole sections.

Figure 3:
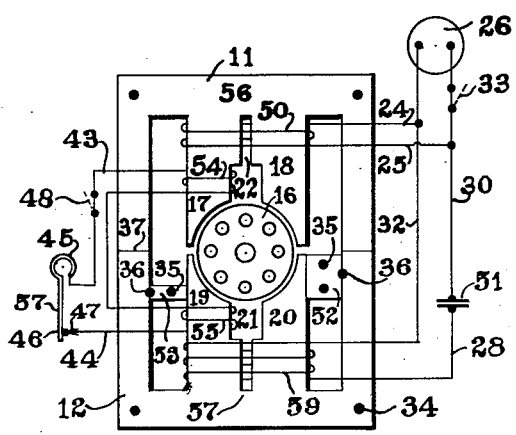

In Figures 1 and 2 the currents in the auxiliary field coil winding are by design made to lag in phase relation the currents in the main field coil winding. In Figure 3 the currents in the auxilary field coil winding are by design made to lead in phase relation the currents in the main field coil winding.

Figure 2 shows a modified form of the invention which is substantially the same as shown in Fig. 1 with the addition of wound phase reversing coils 41 and 42 disposed on pole sections 17 and 20. Said coils have conductors 43 and 44 leading to a switch 45 which may be a thermostat or a sensitive switch having contacts 46 and 47. A hand control switch 48 may be provided. When contacts 46 and 47 are separated the reversing coils are ineffective but when switch 33 is closed and the stator 11 is energized the motor will initiate and maintain rotation without the use of any shading coils as was heretofore required and, when the switch 48 having contacts 46 and 47 is closed, thus short circuiting the reversing coils a reversal in the direction of rotation of rotor 16 will be effected by reverse phase splitting created between the main field pole piece sections 17 and 19 and the auxiliary field pole sections 19 and 20 thereby reversing the direction of rotation of the rotary magnetic field and hence of the rotor.

It will be seen that the conductors 24 and 25 of the main field coil 23, and the conductors 28, 30 and 32 of the auxiliary field coil 27 are connected to the main source of power 26 so that when the energized main field pole 14 including its divided pole sections 17 and 18 are magnetically north (N) the auxiliary field pole 15 and its divided pole sections 19 and 20 will at that instant be magnetically south (S).

Figure 3 shows the invention in the form of a capacitor motor wherein two shunt members 52 and 53 are used. The shunt member 52 is disposed in contacting position between the stator leg 13 and the pole section 20, whereas the shunt member 53 is disposed between the stator leg 12 and the pole section 19 as shown. The purpose of this is to obtain approximately the same torque in either direction of rotation of the armature. However, the torque may be made unequal in either direction of rotation by varying the size and locations of said shunt or shunts. The main field winding member 50 is connected by conductors 24 and 25 to source of power 26. The auxiliary field winding member 59 is connected to source of power 26 by conductors 28, 30, 32 and capacitor 51.

The rotary magnetic field reversing coils 54 and 55 are disposed directly opposite to each other on pole section 17 of the main field pole 56 and pole section 19 of the auxiliary field pole member 57 respectively, and are connected in series and thence to switch 45 by means of conductors 43 and 44 and hand switch 48. When the main and auxiliary field winding members and the stator are energized from a source of electrical power 26 the coaction between the various members in the motor including shunt members 52 and 53 produces a rotary magnetic field threading the stator and rotor. Contacts 46 and 47 of a preferably adjustable thermal switch 45 are designed to make and break by the action of bi-metallic member 57 within the limits of predetermined temperature differential.

Upon contacts 46 and 47 closing the reversing coils 54 and 55 are short circuited and a reversal in the direction of rotation of the rotary magnetic field and rotor is effected and maintained so long as the motor remains connected to the source of power and contacts 46 and 47 remain closed. When by the action of switch 45 contacts 46 and 47 are made to separate the rotary magnetic field threading the rotor and the rotor resume and maintain their former direction of rotation.

Thermal switch 45 may be omitted provided the circuit thus broken is made continuous by the insertion of suitable conductors and the motor may then be operated and controlled by hand switch 48. The single contact thermal switch 45 may also be replaced by any other suitable switch.

The locations of the reversing coils 54 and 55 and of the shunt members 52 and 53 illustrate the novelty, utility and characteristics of the present invention.

From the above it will be seen that the rotary magnetic field is produced by the coaction of the main field winding and the auxiliary field windings and the shunt member or members. Also by the external phase splitting device which may be in the form of a resistor, condenser, inductor or other suitable combinations.

So long as said motor remains energized from the source of power 26, switch 33 being closed, in the case of a two pole motor shown in Figs. 1 to 3 inclusive, a rotary magnetic field threading the rotor will be produced by the coaction of both the main and auxiliary field members and a resistor or condenser and one or more shunt members 31 or 52—53 as described, causing the armature to rotate in one direction and, in the case of Figs. 2 and 3, when switches 45 and 48 of the reversing coils are closed the rotary magnetic field will be reversed causing the armature to rotate in the opposite direction and when the said switches 45 or 48 are opened the original direction of rotation of said rotary magnetic field and armature will be restored.

Figure 5:
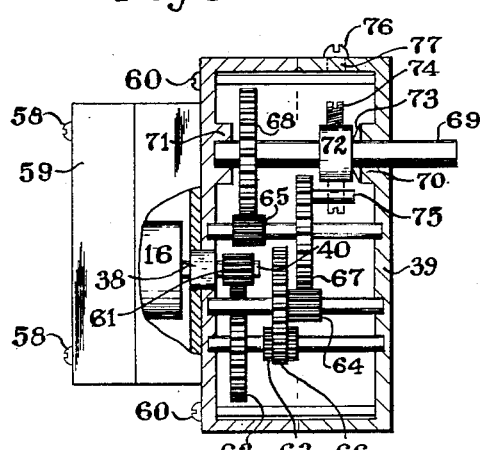
Fig. 5 is an elevational view of the operating unit with a housing in section showing a train of gears therein, also showing a housing containing the motor removably mounted on said gear housing, said housings having cut away portions showing the detachable motor in operative relation with the said train of gears.

Figure 5 shows an improved operating assembly comprising an individual housing 39 containing a train of reducing gears as shown and a separate housing 59 containing the motor assembly removably attached to said gear housing with the motor in operative engagement with the said train of gears. The rotor 16 and stator 11 are suitably mounted in motor housing 59 by means of screws 58—58 or by any other suitable means known in the art.

Both housings may be made in two parts and may be held in fixed positions by said screws 58—58 and by screws 60—60. The motor proper and train of reducing gears may be combined within a single common housing, however, the utility and advantages of the separate housing assemblies will be apparent since in this manner the motor housing may be used singly or in combination with the gear housing. A different ratio of already mounted set of reducing gears may thus be quickly substituted with gear 62 in operative meshing relation and with the pinion 61 on motor shaft 40 without disturbing the housing 59 containing the motor unit. It being understood that bearing 38 may be fixed in the wall of housing 39 only and preferably to slidingly engage a corresponding opening in the wall of housing 39 as shown.

In the present reducing train of gears shown, spur pinion 61 is mounted on shaft 40 and in mesh with spur gear 62. Likewise successive pinions 63, 64 and 65 are mounted in meshing relation with successive gears 66, 67 and 68 respectively. Each one of these gears is mounted on an axle rotating in suitable bearings in said housing as shown while the terminal axle 69 rotates in bearings 70 and 71 respectively. A collar 72 and a spring washer 73 are mounted on final drive shaft or axle 69 for the longitudinal adjustment of said axle to the desired position in bearings 70 and 71. Said collar may be rotated to the desired position on axle 69 and fixed thereon by means of protruding set screw 74. At times it may be desirable to limt and also to control the rotation of the motor in either direction and we have provided a simplified new and useful means to accomplish this without necessitating the disassembling of the gear housing 39. In order to obtain this new useful result one gear only of the whole train of gears, in this instance spur gear 67, is provided with a stud 75, so that, after predetermined rotation of rotor 16 in either direction, the projecting screw 74 preferably moving in the same direction at different rate of speed will be engaged by the stud on said gear 67, thereby stalling the motor in accordance to the pre-adjusted position of said collar and projecting set screw 74 on shaft 69. Control of motor rotation in either direction may thus be quickly secured by merely removing screw 76 on top of housing 39 wherein access to the collar 72 may be had for adjusting said collar to the desired position by a suitable tool such as a screw driver introduced in opening 77, the set screw 74 may thus be quickly positioned at the desire point around the shaft or axle 69 with respect to said stud 75 without as aforesaid opening housing 39 nor disturbing the adjusted train of gears therein. When continuous rotation of motor in either direction is desired a shorter set screw 74 is substituted to thereby omit engagement of the same with the said stud.

Figure 6:
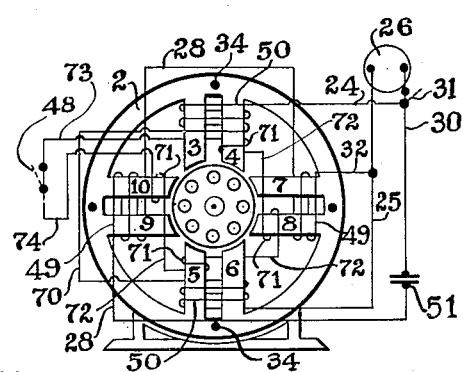
Fig. 6 is another elevational view of a self starting electric motor having four poles adapted to initiate and maintain rotation of the motor in one direction free from the influence of any short circuited energized shading means and including wound coils adapted to reverse the direction of rotation of the motor when said coils are short circuited and energized.

Figure 6 illustrates another form of the invention in the form of a four pole split phase alternating current motor which produces a rotary magnetic field and initially starts rotation of rotor 16 in the desired direction free from the influence of any shading means when the motor is energized and so that the direction of rotation of said rotor may be reversed by use of short circuited energized reverse phase splitting reversing coils 71, 71, 71, 71. One each of said reversing coils is provided on each pole section 4, 8, 5 and 19 as shown and connected in series by suitable conductors 72, 73 and 74 to switch 48. Said reversing coils when short circuited by the closing of switch 48 cause the rotary magnetic field threading the rotor 16 to be reversed, thereby also reversing and maintaining the direction of rotation of said rotor so long as switch 48 remains closed. In this form due to the fact that two pairs of field poles and two pairs of field coils are used to produce the rotary magnetic field the magnetic shunt members are omitted. The motor includes a stator 2 having four poles divided into pole sections 3, 4, 5, 6, 7, 8, 9 and 10 between which the said rotor or armature is adapted to rotate. In the preferred form auxiliary windings 50—50 are mounted to embrace both pole pieces 3—4 and 5—6 respectively, the same being energized by alternating current by lead wires 24, 25 and 70 and switch 33 from a suitable source of power 26. As shown main field windings 49—49 are mounted so as to embrace both the opposite pole piece sections 7—8 and 9—10 and are energized by lead wires 32, 25, 30 and 28, a suitable capacitor 51 being provided between leads 28 and 30. It will be understood that a motor having a greater number of poles, pole sections and windings may be used when desired. Switch 48 of reversing coil means shown in Fig. 6 may be replaced by a suitable sensitive automatic switch.

As heretofore pointed out, we have produced a two pole motor which produces a rotary magnetic field which may be reversed by reverse phase splitting coils. Each pole is divided into two pole sections with the slots between them preferably extending adjacent the main body of the stator. The windings, resistor and magnetic shunt or shunts described produce the rotary magnetic field to initiate rotation of the armature in one direction. The reverse coils may be disposed diagonally or directly opposite to each other on one section of each pole as shown for reversing the said rotary magnetic field and hence the direction of rotation of the armature when the motor is energized with suitable alternating current. It will be understood that the slots shown could be modified as desired depending on the capacity horse power it is desired to obtain.

Slots 22—22 and slots 21—21 could be modified in width and length to requirement.

Due to the high efficiency of the motors herein described the motors maintain a noticeably lower temperature under all operating conditions. Therefore, smaller over all motors for a greater rated horse power may be used. In the case of a fractional horse power motor, it is preferred that the ohmic resistance of the reversing coils be comparatively high in proportion to that of the external switch circuit. We prefer for instance 550 turns of No. 31 enameled copper wire for each reversing coil to prevent excessive current losses in the external control circuits of the motor. The improved motors herein described may be modified for different horse power.

It is evident that the usual losses caused by the use of conventional shading means is avoided in one direction of rotation of the motor and the losses caused by the use of conventional opposing shading means or coils when motor rotates in the opposite direction is non-existent resulting in a substantial saving in electrical power especially in connection with larger size motors.

The method of shunting or bridging between two pole sections and the leg or legs of the stator in connection with an existing phase difference produced by a resistor or capacitor in the auxiliary field winding circuits produces and maintains a rotary magnetic field threading the rotor in a stator having only two field poles each field pole being divided into two pole sections, thereby producing a two pole motor which is self-starting and which will maintain rotation of its rotor solely by use of a rotary magnetic field, when said motor is energized by alternating current. The shunt link member or members bridging between one or two of the pole piece sections and the leg or legs of the stator producing a phase difference between a section of the main pole member and at least one section of the auxiliary pole member in a two pole motor. The shunt means also permits the reversal of the rotary magnetic field including the direction of rotation of the rotor in cooperation with the rotary magnetic field reversing coil means described. The said shunt means also permits the equalization of the torque in either direction of rotation of the rotor.

While the preferred construction and arrangements of the invention have been shown in the drawings and described in the specification, it will be understood that various changes may be made without departing from the spirit and scope of the invention as expressed in the appended claims.

What we claim as our invention is:

1. An alternating current induction motor, comprising a rotor, a stator core having leg members and two opposite pole pieces each divided into two spaced pole sections, said pole pieces having each a primary winding means wound thereon and connected to produce opposing fluxes, phase-splitting means in circuit with at least one of said winding means, and a flux-shifting magnetic shunt member extending between each pole section of the same pole piece and at least one leg each of said core and adapted to cause said pole pieces to produce a rotary magnetic field threading said core and rotor when said winding means are excited by alternating current.

2. An alternating current induction motor, comprising a rotor and a stator core having leg members and two opposite pole pieces each divided into two spaced pole sections, said pole pieces having each a primary winding means wound thereon for oppositely polarizing said pole pieces, and one magnetic shunt member between one pole section of each opposite pole piece and a portion of the core and adapted to cause said pole pieces to produce a rotary magnetic field threading said core and rotor when said winding means are excited by alternating current.

3. A split phase alternating current motor comprising a rotor, a stator core having two opposed pole pieces, each divided into two pole sections, means for imparting like polarity to said pole pieces, a magnetic yoke connecting said pole pieces, and a magnetic shunt disposed between said yoke and at least two but less than all of said pole sections for producing a rotary magnetic field when said pole pieces are polarized.

4. A split phase alternating current motor comprising a rotor, a stator core having two opposed pole pieces, each divided into two pole sections, means for imparting like polarity to said pole pieces, a magnetic yoke connecting said pole pieces, a magnetic shunt disposed between said yoke and at least two but less than all of said pole sections for producing a rotary magnetic field when said pole pieces are polarized, and short circuiting means for shading a pole section of each of said pole pieces for reversing the direction of rotation of said rotor.

5. A split phase alternating current motor of the induction type comprising a rotor, a stator core having a plurality of spaced pole pieces each divided into pole sections, a magnetic yoke connecting said pole pieces, a winding for similarly polarizing adjacent ones of said pole pieces, magnetic shunting means disposed between said yoke a leading section of one and the adjacent lagging section of another pole piece to produce a rotating magnetic field when said winding is energized, and short circuiting winding means disposed partly on a shunted section and partly on a non-shunted section of said pole pieces for reversing the direction of travel of said rotating field.

6. The combination set forth in claim 5 wherein thermostatic switch means is provided for controlling said short-circuiting means.

7. A split phase alternating current motor of the induction type, comprising a rotor, a stator core having a plurality of spaced pole pieces each divided into pole sections, a magnetic yoke connecting said pole pieces, a winding for similarly polarizing adjacent ones of said pole pieces, a plurality of magnetic shunts disposed between said yoke and adjacent pole sections of one of said pole pieces to produce a rotating field when said winding is energized, short circuiting winding means disposed partly on a shunted section and partly on a non-shunted section of said pole pieces for reversing the direction of travel of said rotating field, and means for controlling said short circuiting winding.

8. A split phase alternating current motor having a rotor and a stator core with diametrically spaced pole pieces each divided into pole sections, a magnetic yoke forming a part of said core and connecting said pole pieces, winding means for producing opposing fluxes in said pole pieces, and magnetic shunt means between said yoke and one of said pole sections for starting rotation of the rotor when the winding is energized.

9. A reversible split phase alternating current motor having a rotor and a core having diametrically opposed pole pieces each divided into pole sections, winding means for said core for supplying currents relatively displaced in phase to said opposite pole pieces, a switch means for said winding means, a magnetic shunt flux shifting means associated with said core and pole sections for producing a rotary magnetic field threading said rotor to initiate and maintain rotation of said rotor, and winding means carried by one of said pole sections to reverse the direction of rotation of said rotary magnetic field and rotor.

ARTHUR E. SPINASSE.
WILLIAM H. PUMPHREY, Sr.

REFERENCES CITED

The following references are of record in the file of this patent:

UNITED STATES PATENTS

| Number | Name | Date |
|---|---|---|
| 522,356 | Stanley | July 3, 1894 |
| 805,499 | Stoycheff | Nov. 28, 1905 |
| 1,590,025 | Hall | June 22, 1926 |
| 1,983,091 | Larsh | Dec. 4, 1934 |
| 2,002,382 | Wilson | May 21, 1935 |
| 2,003,163 | Warren | May 28, 1935 |
| 2,019,323 | Stark | Oct. 29, 1935 |
| 2,037,606 | Van Der Woude | Apr. 14, 1936 |
| 2,055,049 | Roll | Sept. 22, 1936 |
| 2,100,809 | Larocca | Nov. 30, 1937 |
| 2,245,229 | Shaw | June 10, 1941 |
| 2,253,524 | Lilja | Aug. 26, 1941 |
| 2,322,942 | Lange | June 29, 1943 |
| 2,388,884 | Thompson | Nov. 13, 1945 |

FOREIGN PATENTS

| Number | Country | Date |
|---|---|---|
| 636,833 | Germany | Oct. 17, 1936 |